US009836443B2

(12) United States Patent
Mese et al.

(10) Patent No.: US 9,836,443 B2
(45) Date of Patent: Dec. 5, 2017

(54) CHANGING TEXT INPUT MODES

(71) Applicant: LENOVO (Singapore) PTE, LTD., New Tech Park (SG)

(72) Inventors: John Carl Mese, Cary, NC (US); Nathan J. Peterson, Durham, NC (US); Russell Speight VanBlon, Raleigh, NC (US); Rod D. Waltermann, Rougemont, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 260 days.

(21) Appl. No.: 14/634,488

(22) Filed: Feb. 27, 2015

(65) Prior Publication Data

US 2016/0253299 A1   Sep. 1, 2016

(51) Int. Cl.
*G06F 17/21* (2006.01)
*G06F 17/24* (2006.01)
*G06F 3/0488* (2013.01)
*G06F 3/023* (2006.01)
*G06F 17/27* (2006.01)

(52) U.S. Cl.
CPC ............ *G06F 17/24* (2013.01); *G06F 3/0237* (2013.01); *G06F 3/04886* (2013.01); *G06F 17/276* (2013.01)

(58) Field of Classification Search
CPC ...................................................... G06F 17/24
See application file for complete search history.

(56) References Cited

U.S. PATENT DOCUMENTS

| | | | | |
|---|---|---|---|---|
| 521,069 | A * | 6/1894 | Baker et al. | D04B 35/08 66/123 |
| 5,210,689 | A * | 5/1993 | Baker | G06F 3/0489 341/22 |
| 8,612,213 | B1 * | 12/2013 | Zhai | G06F 17/24 704/251 |
| 8,782,550 | B1 * | 7/2014 | Patridge | G06F 3/0488 715/702 |
| 2007/0079239 | A1 * | 4/2007 | Ghassabian | G06F 3/014 715/707 |
| 2014/0215397 | A1 * | 7/2014 | Bilinsky | G06F 3/0237 715/816 |
| 2014/0282201 | A1 * | 9/2014 | Pasquero | G06F 3/0237 715/773 |

* cited by examiner

*Primary Examiner* — James J Debrow
(74) *Attorney, Agent, or Firm* — Kunzler PC

(57) ABSTRACT

An apparatus, method, program product, and system are disclosed for changing text input modes. A text input module receives text input in a first text input mode from a text input device, the first text input mode may comprise a predictive text input mode. A trigger detection module detects a triggering event associated with text input received in the first text input mode. The triggering event may be intended to change a text input mode of the text input device. A mode change module changes the text input from the first text input mode to a second text input mode in response to the triggering event. The second text input mode may comprise a literal text input mode.

20 Claims, 6 Drawing Sheets

CHANGING TEXT INPUT MODES

BACKGROUND

Field

The subject matter disclosed herein relates to entering text input and more particularly relates to changing a text input mode during text input.

Description of the Related Art

Information handling devices, such as smart phones, tablet computers, laptops, etc., may include a text input device that has prediction and/or auto-correct features. The prediction features of a text input device may attempt to predict the word that the user intends to enter while the user enters characters of the word. The auto-correct features of a text-input device may correct any misspelled words or words that are not recognized by the text input device by inserting a predicted word. While these features may be useful, a user may want to change when these features are active. Some text input device may allow a user to manually activate or deactivate these settings, but it may be tedious or cumbersome to do so while the user is entering text.

BRIEF SUMMARY

An apparatus for changing text input modes is disclosed. A method and computer program product also perform the functions of the apparatus. In one embodiment, an apparatus includes a text input device and a processor operably coupled to the text input device. The apparatus, in a further embodiment, includes a memory that stores code executable by the processor. In one embodiment, the executable code includes code that receives text input in a first text input mode from the text input device. In one embodiment, the first text input mode comprises a predictive text input mode.

In some embodiments, the executable code includes code that detects a triggering event associated with text input received in the first text input mode. In certain embodiments, the triggering event intends to change a text input mode of the text input device. In a further embodiment, the executable code includes code that changes the text input from the first text input mode to a second text input mode in response to the triggering event. The second text input mode may comprise a literal text input mode.

In one embodiment, the triggering event comprises determining that the text input comprises a sequence of characters comprising at least a portion of a recently deleted word. In a further embodiment, the triggering event comprises determining that a word entered in the first text input mode is being edited. In various embodiments, the triggering event comprises determining that the text input is entered within a predefined time after a word has been entered and that the text input comprises a suffix for the word. In one embodiment, the suffix is added to the word that precedes the suffix. In some embodiments, the suffix is selected from the group consisting of a plural suffix, an action suffix, and a hyphen.

In one embodiment, the executable code includes code that changes the text input mode from the second text input mode back to the first text input mode in response to a restore event. In some embodiments, the restore event comprises not receiving text input in the second text input mode for a predefined period of time. In certain embodiments, the executable code includes code that presents one or more suggested words based on the text input such that a word of the one or more suggested words is spelled according to a sequence of characters received in the second text input mode.

In one embodiment, the executable code includes code that changes the text input mode from the first text input mode to a second text input mode in response to detecting a mode-changing gesture. The executable code, in another embodiment, includes code that presents an option to change the text input mode from the first text input mode to the second text input mode in response to the triggering event. In various embodiments, the executable code includes code that adds a word entered in the second text input mode to a word list associated with the text input device. In one embodiment, the text input device includes a swipe-enabled text input device.

A method, in one embodiment, includes receiving, by use of a processor, text input in a first text input mode from a text input device. In some embodiments, the first text input mode comprises a predictive text input mode. In one embodiment, the method includes detecting a triggering event associated with text input received in a first text input mode. In some embodiments, the triggering event is intended to change a text input mode of the text input device. In a further embodiment, the method includes changing the text input mode from the first text input mode to a second text input mode in response to the triggering event. In various embodiments, the second text input mode includes a literal text input mode.

In one embodiment, the triggering event includes determining that the text input includes a sequence of characters comprising at least a portion of a recently deleted word. In another embodiment, the triggering event includes determining that the word entered in the first text input mode is being edited. In a further embodiment, the triggering event includes determining that the text input is entered within a predefined time after a word has been entered and that the text input includes a suffix for the word.

In one embodiment, the method further includes presenting one or more suggested words based on the text input. In some embodiments, a word of the one or more suggested words is spelled according to a sequence of characters received in the second text input mode. In certain embodiments, the method includes presenting an option to change the text input mode from the first text input mode to the second text input mode in response to the triggering event.

A program product, in one embodiment, includes a computer readable storage medium that stores code executable by a processor. The executable code, in one embodiment, includes code to perform receiving text input in a first text input mode from a text input device. In some embodiments, the first text input mode includes a predictive text input mode. In another embodiment, the executable code includes code to perform detecting a triggering event associated with text input received in the first text input mode. In various embodiments, the triggering event is intended to change a text input mode of the text input device. The executable code, in some embodiments, includes code to perform changing the text input mode from the first text input to a second text input mode in response to the triggering event. The second text input mode may include a literal text input mode.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
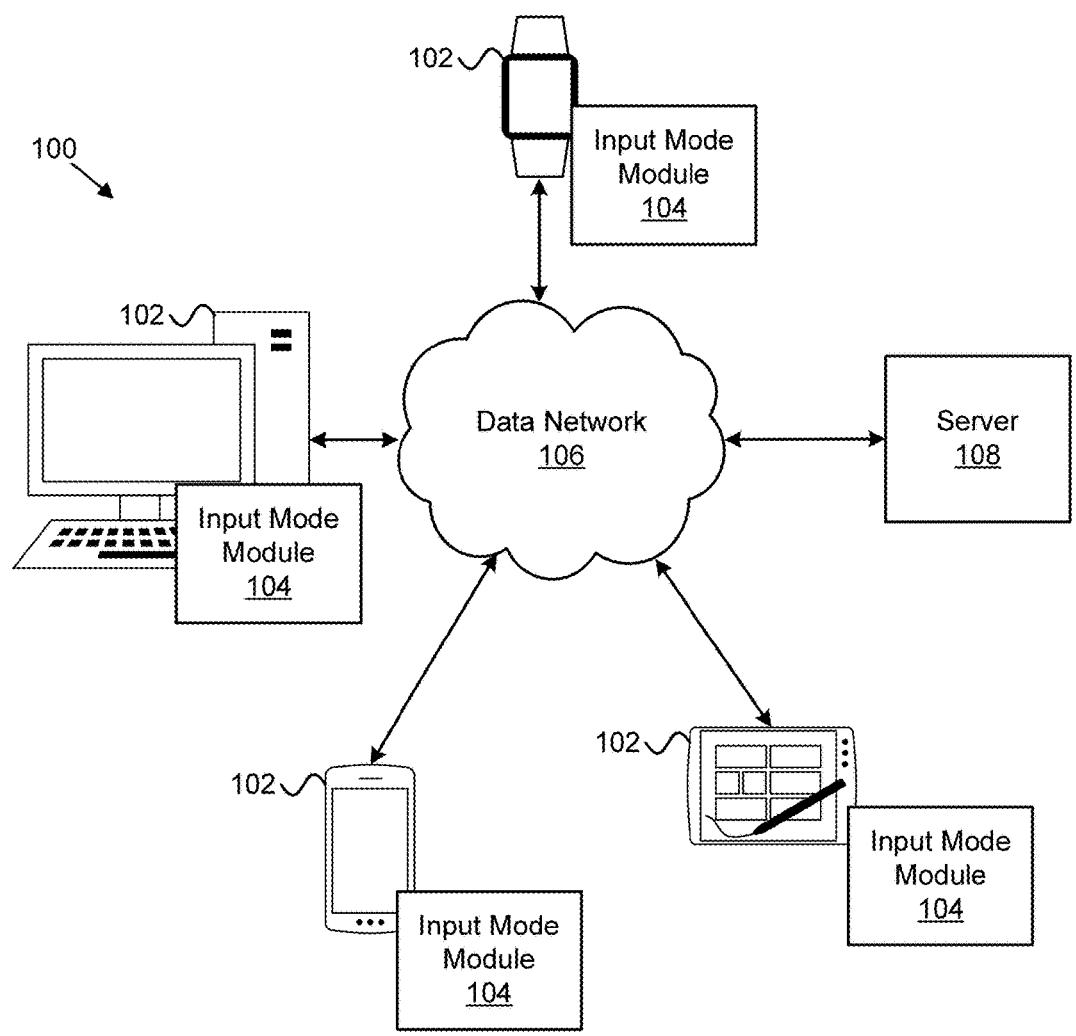
FIG. 1 is a schematic block diagram illustrating one embodiment of a system for changing text input modes.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for changing text input modes. In one embodiment, the system 100 includes information handling devices 102, input mode modules 104, data networks 106, and servers 108. Even though a specific number of information handling devices 102, input mode modules 104, data networks 106, and servers 108 are depicted in FIG. 1, one of skill in the art will recognize that any number of information handling devices 102, input mode modules 104, data networks 106, and/or servers 108 may be included in the system 100.

In one embodiment, the information handling devices 102 comprise computing devices, such as desktop computers, laptop computers, personal digital assistants (PDAs), tablet computers, smart phones, smart televisions (e.g., televisions connected to the Internet), set-top boxes, game consoles, or the like. In some embodiments, the information handling devices 102 comprise wearable devices, such as smart watches, fitness bands, optical head-mounted displays, or the like. In certain embodiments, the information handling devices 102 are configured to create, generate, send, receive, or the like, text-based input such as short message service (SMS) messages, email messages, web browser input, notes, or the like.

In certain embodiments, the information handling devices 102 include text input devices such as virtual keyboards, physical keyboards, voice input devices that convert speech to text, or the like, which allow a user to enter text input. As used herein, a virtual keyboard may comprise an on-screen keyboard that is a software component of an information handling device 102 and allows a user to enter characters, such as letters, numbers, symbols, special characters, or the like. Virtual keyboards may be commonly found on information handling devices 102 that include touch-enabled displays, but may also be operated using a physical keyboard and mouse. In certain embodiments, the text input device comprises a swipe-enabled virtual keyboard. As used herein, a swipe-enabled virtual keyboard may comprise a virtual keyboard where words are entered by sliding a finger or stylus from the first letter of a word to its last letter, lifting only between words. In certain embodiments, a swipe-enabled virtual keyboard may use error-correction algorithms and language models to guess or predict the intended word. Some swipe-enabled virtual keyboards may include a predictive text system, handwriting, and speech recognition support.

Swipe-enabled virtual keyboards may use a word list or dictionary as part of the auto-correction or prediction system. Thus, if a user swipes a word, the swipe-enabled virtual keyboard may only be able to predict or auto-correct to the word that the user intends to enter if the word is in the word list or dictionary associated with the virtual keyboard. For example, if a user tries to enter a person's name, such as "Adam," the swipe-enabled virtual keyboard may not recognize what the user is attempting to enter and may auto-correct to a different word because "Adam" may not be found in the swipe-enabled virtual keyboard's dictionary. This may also be an issue with non-swipe-enabled keyboards that use auto-correct to predict and insert words that the user intends to enter.

In such an embodiment, the user may delete the incorrect word that the predictive keyboard entered and attempt to re-enter the same word. However, another attempt to enter "Adam" may result in the same incorrect result being inserted by the predictive keyboard. Therefore, it may be advantageous for a predictive keyboard, such as a swipe-enabled virtual keyboard, to recognize when a user is attempting to re-enter a previously deleted word and dynamically switch to a "literal" text input mode, e.g., a text-input mode where the auto-correct and/or prediction feature of the text input device are disabled and the characters entered by the user are literally interpreted by the text-input device, e.g., the characters are entered exactly as the user enters them without using any auto-correction or prediction functionality. Thus, in the previous example, if the user deletes the incorrect word that the auto-correct feature inserted in response to the user attempting to enter the name "Adam," and attempts to re-enter the word "Adam," the input device may disable its auto-correct feature and insert the characters as the user enters them even though the text input device may not recognize the word "Adam." Other triggering events to dynamically switch text input modes are described in more detail below.

The information handling devices 102, and/or the server 108, may include an embodiment of the input mode module 104. In certain embodiments, the input mode module 104 is configured to receive text input in a first text input mode from the text input device. In some embodiments, the first text input mode comprises a predictive text input mode. The input mode module 104, in a further embodiment, is configured to detect a triggering event associated with text input received in the first text input mode. In one embodiment, the triggering event is intended to change a text input mode of the text input device. In certain embodiments, the input mode module 104 is configured to change the text input mode from the first text input mode to a second text input mode in response to the triggering event. In some embodiments, the second text input mode comprises a literal text input mode. In certain embodiments, the input mode module 104 includes various modules that perform one or more of the operations of the input mode module 104, which are described in more detail below with reference to FIGS. 2 and 3.

The data network 106, in one embodiment, comprises a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory (RAM), or the like.

In one embodiment, the servers 108 include computing devices, such as desktop computers, laptop computers, mainframe computers, cloud servers, virtual servers, and/or the like. In some embodiments, the servers 108 are configured as application servers, email servers, database servers, file servers, game servers, home servers, media servers, web servers, and/or the like. In certain embodiments, the servers 108 are communicatively coupled to the information handling devices 102 via the data network such that the information handling devices 102 may store and/or access data on the servers 108 as it relates to the input mode module 104. For example, the servers 108 may store word lists, dictionaries, text input device application data, and/or the like.

Figure 2:
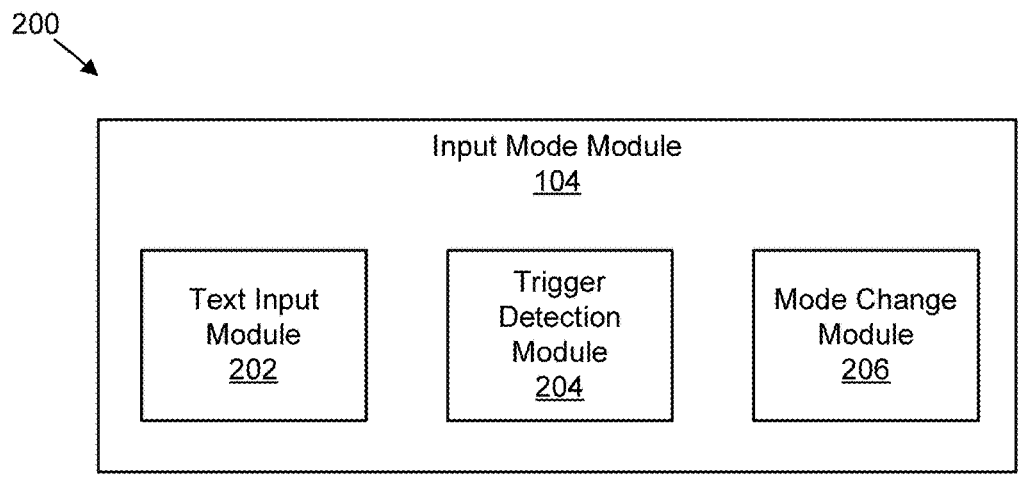
FIG. 2 is a schematic block diagram illustrating one embodiment of a module for changing text input modes.

FIG. 2 depicts one embodiment of a module 200 for changing text input modes. In one embodiment, the module 200 includes an embodiment of an input mode module 104. The input mode module 104, in certain embodiments, includes a text input module 202, a trigger detection module 204, and a mode change module 206, which are described in more detail below.

In one embodiment, the text input module 202 is configured to receive text input in a first text input mode from a text input device. As described above, the text input device may comprise a virtual keyboard, a physical keyboard, or the like. Moreover, the keyboard may be swipe-enabled and may have auto-correction and/or word prediction functionality. In one embodiment, the first text input mode comprises a predictive text input mode. As used herein, a predictive text input mode may be a text input mode where one or more words are predicted and/or suggested to a user based on one or more characters entered by the user.

For example, in one embodiment, a user may enter a portion of a word on a swipe-enabled virtual keyboard and the text input device (e.g., the word suggestion module 304) may suggest one or more words to a user based on a prediction value, threshold, confidence, or the like. In another example, a user may indicate that he is finished entering a word by entering a space character after one or more previous characters have been entered; however, if the word is misspelled or is otherwise not recognized by the text input device, such as if the word is not found in a dictionary/word list associated with the text input device, the text input device may automatically correct the word to a suggested word that has the highest prediction value based on the word entered by the user.

In some embodiments, however, the word inserted as a result of the auto-correct function may not be the word that the user intended to enter. In such a situation, the user may delete the inserted word and re-enter the intended word, only to have the auto-correct function of the text input device insert the wrong word again. This is often a frustrating experience for the user, especially on a swipe-enabled virtual keyboard, because the user will be required to delete the word again and re-enter the word one character at a time instead of being able to swipe the word. As described herein, the input mode module 104 may dynamically change the input mode from a predictive mode to a literal mode in response to various triggering events.

In one embodiment, the trigger detection module 204 is configured to detect a triggering event associated with text input received in the first text input mode. As used herein, a triggering event may comprise an event intended to change a text input mode of a text input device. In certain embodiments, the triggering event includes determining that the text input comprises a sequence of characters comprising at least a portion of a recently deleted word. For example, as described above, a user may enter a word and the text input device may auto-correct the word to a different word than the user intended. The trigger detection module 204 may detect that the user's actions of deleting the word and re-entering the characters of the word is a triggering event, which may cause the mode change module 206, described below, to switch the text input mode of the text input device to a second text input mode, e.g., a literal text input mode.

In some embodiments, the trigger detection module 204 detects a triggering event in response to determining that a word entered in the first text input mode is being edited. For example, the trigger detection module 204 may detect that the user is editing a word that the text input device inserted using auto-correct. Instead of auto-correcting the word to the incorrect word again, the trigger detection module 204 may detect the user's actions as an input mode change trigger and notify or otherwise trigger the mode change module 206 to change the text input mode of the text input device.

In a further embodiment, the trigger detection module 204 detects a triggering event in response to determining that the text input is entered within a predefined time after a word has been entered, either in a predictive or literal text input mode, and that the text input comprises a suffix for the word. Some text input devices that employ an auto-correct or predictive text input mode (such as a swipe-enabled text input device) may begin a new word in response to a user lifting a finger or other input device from the text input device. In particular, a swipe-enabled text-input device may automatically insert a space after a word in response to a user lifting a finger or other input device from the swipe-enabled text input device. Thus, if the user lifts a finger or other input device and then tries to add a suffix to the end of the word, the user may have to delete the word or the inserted space to add the suffix to the word.

The trigger detection module 204, in certain embodiments, determines whether one or more characters, such as a suffix, are entered within a predefined timeout period after a word has been entered, e.g., a predefined timeout period after a user lifts a finger or other input device from the text input device after entering a word. For example, a user may enter "click" using a swipe-enabled text input device. After the user enters the "k" character at the end of the word, the user may lift up his finger, which may cause the prediction or auto-correct functionality of the text input device to insert a space for a new word to be entered. The user, however, may have inadvertently lifted his finger, but wants to add an "ing" to the end of the word "click" to spell out "clicking." The trigger detection module 204, in response to the user swipe-entering the "ing" suffix within a predefined period of time after the word "click" was entered, such as 5 milliseconds, 10 milliseconds, or the like, may determine that the entered characters, e.g., the suffix "ing," were meant to be a part of the word "click" and may merge or combine the suffix with the previously entered word. The trigger detection module 204 may detect various suffixes as part of the triggering event, such as plural suffixes (e.g., "s," "es,"), action suffixes (e.g., "ing"), a hyphen (e.g., the use of a hyphen to form compound words or hyphenated modifiers), past tense suffixes (e.g., "ed"), or the like.

In one embodiment, the mode change module 206 changes the text input mode of the text input device from the first text input mode to a second text input mode in response to the triggering event. In certain embodiments, the second text input mode comprises a literal text input mode. As described above, a literal text input mode may comprise a text-input mode where the auto-correct and/or prediction feature of the text input device are disabled and the characters entered by the user are literally interpreted by the text-input device. Thus, the mode change module 206 may change the text input mode of the text input device from a predictive or auto-correct text input mode to a literal text input mode in response to the various triggering events detected by the trigger detection module 204.

For example, a user may begin entering the name "Meredith," which may not be found in the dictionary for the text input device. As described above, if the text input device auto-corrects the word "Meredith" to a different word, such as "Merry," the trigger module 204 may detect a triggering event in response to the user deleting the word "Merry" and entering the word "Meredith" again. In response to the triggering event, the mode change module 206 may change the input mode for the text input device such that the word "Meredith" will literally be interpreted instead of being changed to the auto-corrected word "Merry."

Figure 3:
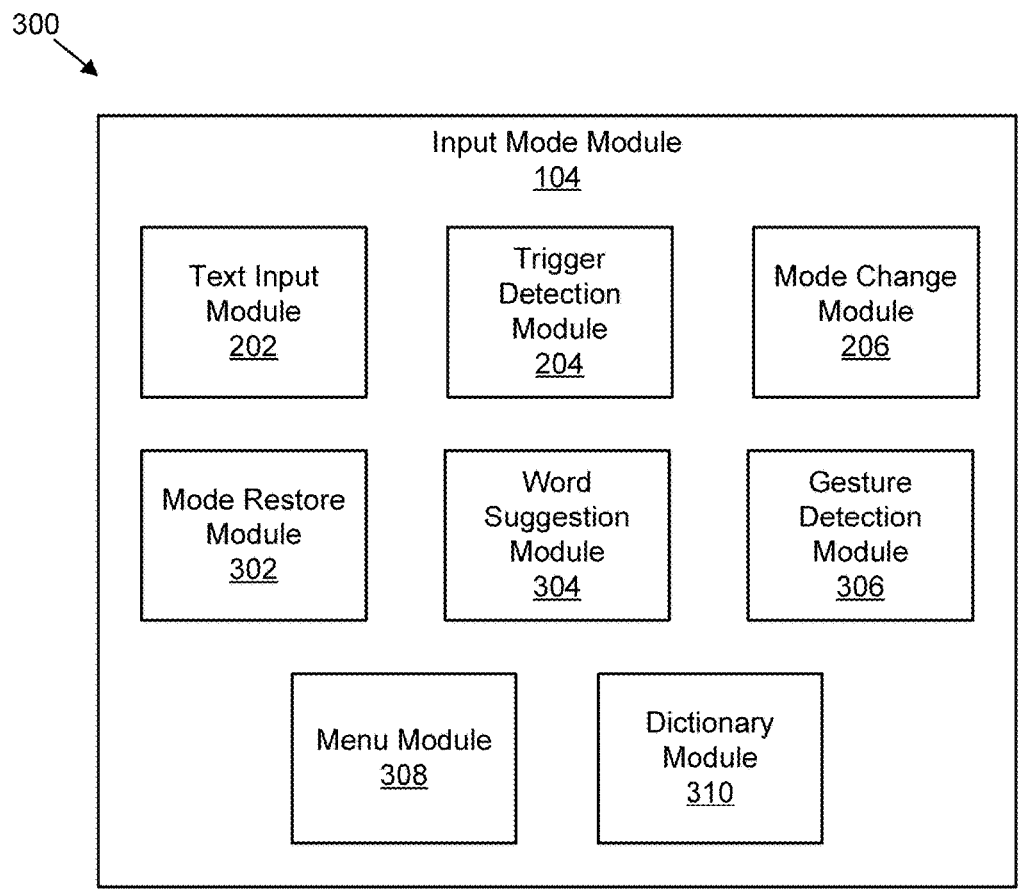
FIG. 3 is a schematic block diagram illustrating one embodiment of another module for changing text input modes.

FIG. 3 depicts one embodiment of a module 300 for changing text input modes. In one embodiment, the module 300 includes an embodiment of an input mode module 104. The input mode module 104, in certain embodiments, includes a text input module 202, a trigger detection module 204, and a mode change module 206, which may be substantially similar to the text input module 202, the trigger detection module 204, and the mode change module 206 described above with reference to FIG. 2. Further, in some embodiments, the input mode module 104 of FIG. 3 includes a mode restore module 302, a word suggestion module 304, a gesture detection module 306, a menu module 308, and a dictionary module 310, which are described in more detail below.

The mode restore module 302, in one embodiment, is configured to change the text input mode from the second text input mode back to the first text input mode in response to a restore event. In one embodiment, the mode restore module 302 changes the text input mode from a literal text input mode back to a predictive text input mode. The restore event, in some embodiments, may comprise a user entering a space character, or another character, that indicates that a word has been successfully entered and that a new word is being entered. Going back to the example above, after the user has entered the word "Meredith" in a literal text input mode, the mode restore module 302 may detect that the user entered a space character to start a new word, which may trigger the mode restore module 302 to change the text input mode from a literal text input mode back to a predictive text input mode.

In a further embodiment, the mode restore module 302 may detect a restore event that comprises not receiving input while in the second text input mode for a predefined period of time. For example, if the user enters a word, such as "Meredith," but does not enter another character after entering the final "h" character for a predefined period of time (e.g., 10 milliseconds, 20 milliseconds, etc.), the mode restore module 302 may interpret that as a mode restore event and restore the text input mode back to the first text input mode, e.g., a predictive text input mode, from the second text input mode, e.g., a literal text input mode.

The word suggestion module 304, in one embodiment, is configured to present one or more suggested words based on the text input received in the first text input mode, e.g., a predictive text input mode. For example, the word suggestion module 304 may determine one or more suggested words as a user enters characters of a word and present one or more of the determined suggested words to the user. If the user begins to enter the word "cow," for example, the word suggestion module 304 may suggest similar words based on the characters entered by the user, such as "cop," "how," "wow," etc.

The word suggestion module 304, in certain embodiments, may determine a confidence score for the one or more suggested words and present suggested words to a user based on the confidence scores. As used herein, a confidence score may comprise a value assigned to one or more predicted words based on the text input that indicates the likelihood of the suggested word matching the word the user intends to enter. For example, the word suggestion module 304 may only present suggested words that have a 90% or higher confidence score. In certain embodiments, if the word suggestion module 304 determines that the suggested words have confidence scores below a predetermined confidence threshold, the word suggestion module 304 may present the word that comprises the literal characters of the word that the user entered, e.g., one of the suggested options may comprise the word that was entered as if in a literal text input mode.

The gesture detection module 306, in one embodiment, is configured to change the text input mode of the text input device in response to detecting a mode changing gesture. A mode changing gesture, as used herein, may comprise a gesture performed with one or more fingers, or other input devices, that is detected by the text input device. For example, a mode changing gesture may comprise swiping the characters of a word twice on a swipe-enabled virtual keyboard, which the gesture detection module 306 may detect as a mode changing gesture such that the text input mode is changed from a predictive input mode to a literal input mode. The gesture detection module 306 may be configured to detect various gestures as mode changing gestures, such as swipes, pinches, taps, and/or the like.

In certain embodiments, the gesture detection module 306 detects gestures performed on single characters, which may indicate that the character should be entered in a literal text input mode. This may be particularly applicable in the case of adding a suffix to an already entered word. For example, if the user entered a word in a predictive text input mode, the user may wish to add the suffix "ing" to the word. Instead of starting a new word in a predictive text input mode, if the gesture detection module 306 detects a gesture performed on the character "i," such as a swipe up gesture or a double-tap gesture, the gesture detection module 306 may enter the character "i" and append it to the end of the previously entered word. Moreover, in such an embodiment, the gesture detection module 306 and/or the mode change module 206 may change the text input mode to a literal text input mode until the suffix has been completely entered by the user or until a different restore event described above.

The menu module 308, in one embodiment, is configured to present an option to change the text input mode from the first text input mode to the second text input mode in response to the triggering event. For example, the menu module 308 may present a graphical interface element that a user may interact with to manually change the text input mode from a predictive text input mode to a literal text input mode in response to one of the triggering events described above. In some embodiments, the menu module 308 presents the option to change the text input mode in place of one of the suggested words presented by the word suggestion module 304. In certain embodiments, the menu module 308 may present one or more suffixes or other word modifiers in response to a user performing a gesture, such as a swipe gesture, on the presented option to change the text input mode.

For example, if a user is swipe-entering the name "Meredith," but halfway through swiping the name the user may realize that the text input device will not recognize the name because it may not be in the dictionary associated with the text input device. If the user lifts his finger midway through entering "Meredith," e.g., if the user swipe-entered "Mere" but then lifted his finger, the menu module 308 may present an option to switch the text input mode to a literal text input mode. In response to the user selecting the option to change the text input mode, the user may continue to swipe-enter the name "Meredith," without the text input device auto-correcting the entered name to a different word. In such an embodiment, as described below, the dictionary module 310 may add the name to the dictionary/word list for the text input device such that the predictive or auto-correct function of the text input module 202 will auto-correct the name to the correct word.

In one embodiment, the dictionary module 310 is configured to add a word entered in the second text input mode to a word list associated with the text input device. For example, the dictionary module 310 may add the word "Meredith" to the dictionary or word list associated with the text input device in response to the user entering "Meredith" in a literal text input mode after the mode change module 206 changed the text input mode from a predictive input mode to a literal input mode. In some embodiments, the dictionary/word list is stored locally on an information handling device 102, such as a smart phone. In some embodiments, the dictionary/word list is stored remotely on a cloud server or the like.

Figure 4A:
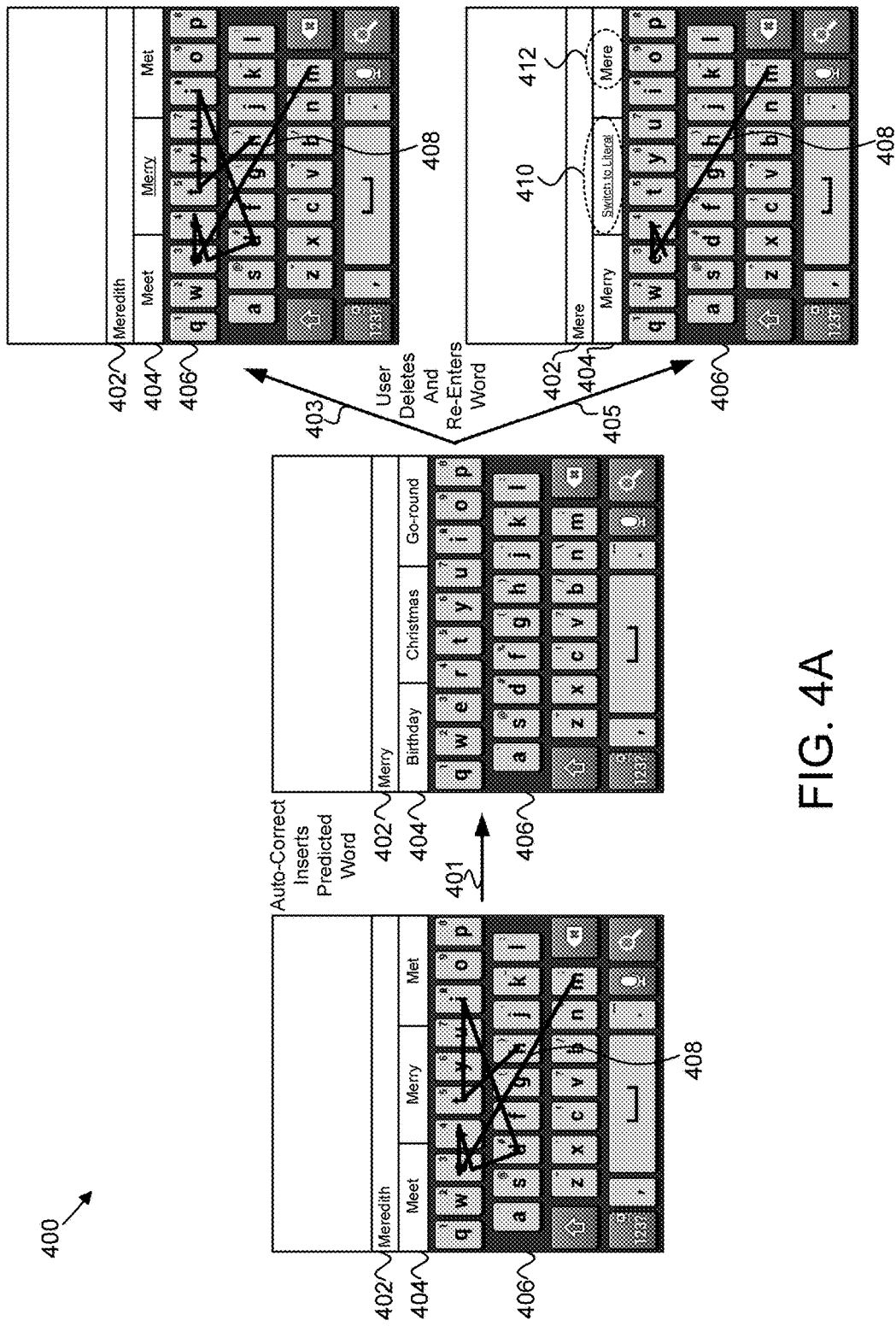
FIG. 4A is a schematic block diagram illustrating one embodiment of changing text input modes.

FIG. 4A depicts one embodiment 400 of changing text input modes of a text input device. In one embodiment, FIG. 4A depicts a text input device 406 for an information handling device 102, such as a smart phone that includes a touch-enabled display. The text input device 406, in one embodiment, is a swipe-enabled virtual keyboard that receives input from an input device, such as a user's finger, a stylus, or the like. In certain embodiments, on a swipe-enabled virtual keyboard, a user enters words by swiping a finger from the first character in the word to the last character while touching each letter in between without lifting his finger. The swipe-enabled virtual keyboard may also include predictive and/or auto-correct features that predict the word the user is intending to enter and may provide one or more word suggestions based on one or more entered characters. Moreover, the auto-correction function may replace misspelled words, words that are not found in a dictionary associated with the text input device, or the like, with a different word, such as a predicted word with the highest confidence score, or the like.

As depicted in FIG. 4A, in one embodiment, the text input module 202 may receive text input in response to a user entering the characters for the word "Meredith" 402. In certain embodiments, the user enters the characters in a predictive text input mode using the swipe-enable virtual keyboard 408. Thus, as the user enters the characters, the word suggestion module 304 may suggest one or more words 404 based on the user input. After entering a space to start a new word, the auto-correct feature of the text input device may replace 401 the word "Meredith" with one of the predicted words, such as "Merry" because the dictionary for the text input device may not include the proper name "Meredith." Thus, the user will need to delete the auto-corrected word "Merry" and reenter the word "Meredith" one character at a time without swiping the characters, which can be frustrating, inefficient, and slow for the user.

In one embodiment, the trigger detection module 202 detects a triggering event in response to the user deleting the inserted word "Merry" and re-entering the word "Meredith." In some embodiments 403, in response to the triggering event, the mode change module 206 may change the text input mode for the text input device from a predictive text input mode to a literal text input mode. In a literal text input mode, each letter that a user enters using a swipe gesture is literally interpreted by the text input device such that the auto-correct feature of the text input device may not insert a suggested word base on the user input. Thus, in the literal mode, the user may swipe enter the word "Meredith" and the text input device may insert the word as entered by the user without entering the auto-corrected word "Merry."

In one embodiment 405, in response to the triggering event, the menu module 308 presents an option 410 to change the text input mode from the predictive text input mode to the literal text input mode. In such an embodiment, the mode change module 206 changes the text input mode in response to a user selecting the option 410 to change the text input mode. In a further embodiment, the word suggestion module 304 presents a word suggestion 412 that is spelled as literally entered by the user. Thus, as a user enters "Meredith," the word suggestion module 304 may present the word "Meredith" as one of the suggested words 404 in place of a suggested word that has the lowest confidence value of the presented word suggestions.

Figure 4B:
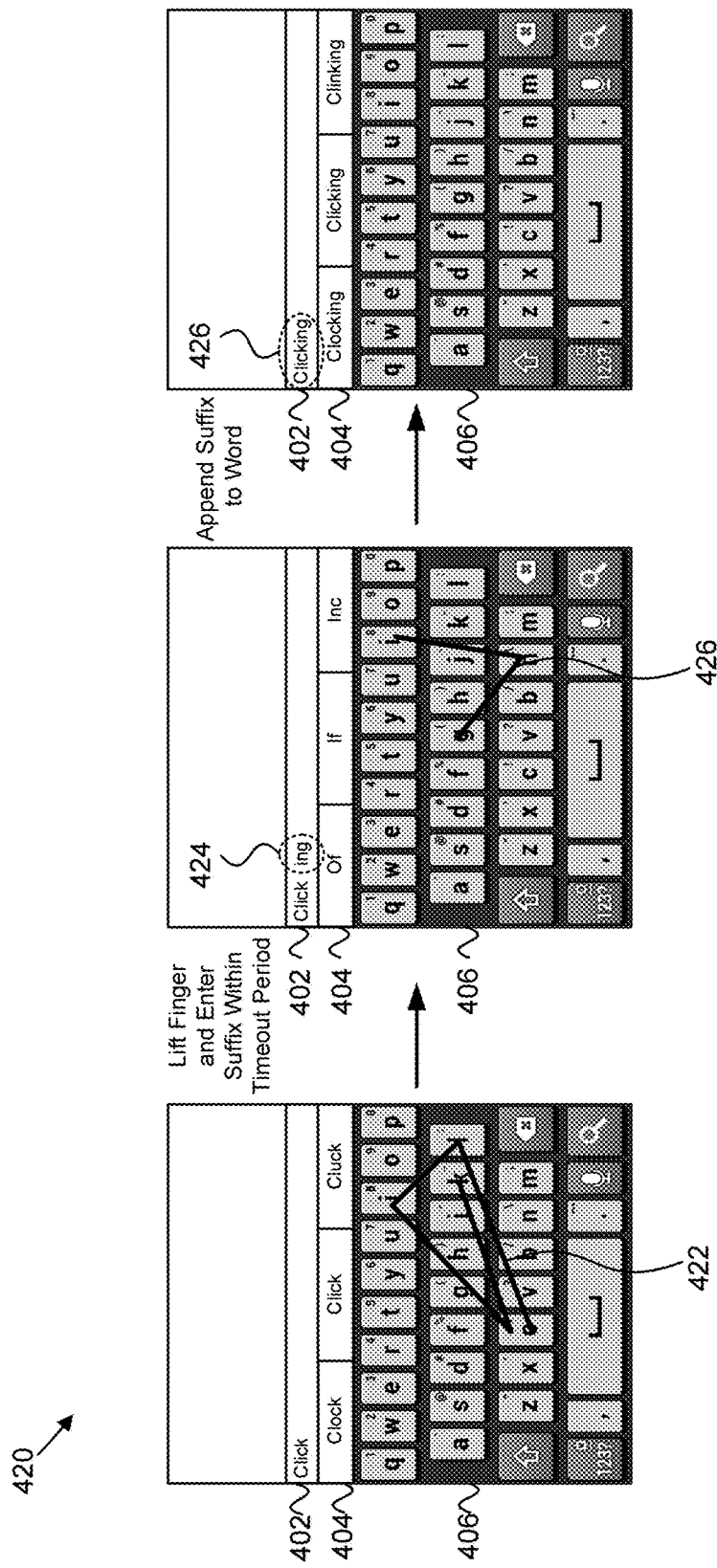
FIG. 4B is a schematic block diagram illustrating one embodiment of changing text input modes.

FIG. 4B depicts one embodiment 420 of changing text input modes of a text input device 406. In one embodiment, the text input module 202 receives the word "click" 402 as text input entered by a user on a swipe-enabled text input device 406 in a predictive text input mode. In certain embodiments, the word suggestion module 304 presents one or more suggested words 404 based on the text input. In certain embodiments, after a user swipe enters 422 the word "click" 402 on the swipe-enabled text input device 406, the user may want to add a suffix, hyphen, or the like to the entered word. However, on traditional swipe-enabled virtual keyboards, when a user lifts his finger after entering a word, the text input device may insert a space to begin a new word. Thus, the user will have to delete the space to add a suffix to the previously entered word.

In some embodiments, however, the trigger detection module 204 may detect that the user is entering a suffix and notify the mode change module 206 to change the text input mode from a predictive text input mode to a literal text input mode. For example, in response to the user swipe-entering 426 "ing" 424, the trigger module 204 may detect that the text input "ing" 424 is a suffix and the mode change module 206, in response to the trigger event, may change the text input mode from a predictive text input mode to a literal text input mode such that the text input "ing" is not automatically corrected to a predicted word. In certain embodiments, the trigger detection module 204 detects that the user intends to add a suffix to a previously entered word in response to the suffix being entered within a predefined timeout period after the previously entered word was entered.

In certain embodiments, the trigger detection module 204, the mode change module 206, the text input device 406, or the like, appends, combines, or otherwise merges the entered suffix "ing" 424 with the previously entered word "click" to make a single word "clicking" 426. In this manner, if the user lifts his finger after entering a word, but would like to add a suffix to the entered word, the user is not required to delete a space that may have been automatically inserted after the word. Moreover, by changing the text input mode in response to detecting that a suffix has been entered, the text input mode will not attempt to auto-correct the suffix to a different word because the suffix may not be found in the dictionary associated with the text input device 406.

Figure 5:
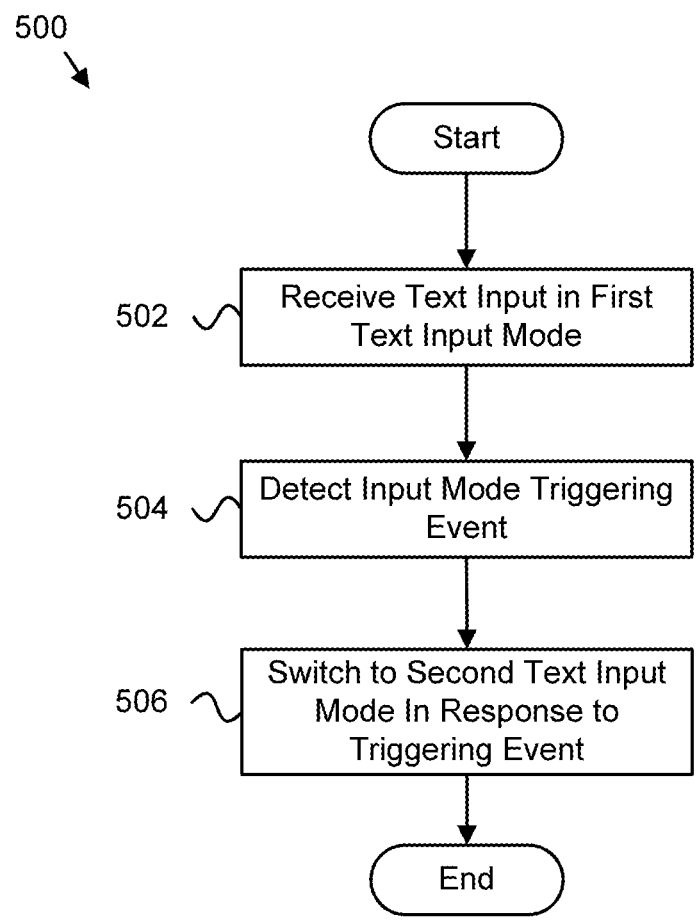
FIG. 5 is a schematic flow chart diagram illustrating one embodiment of a method for changing text input modes.

FIG. 5 depicts a flow chart diagram illustrating one embodiment of a method 500 for changing text input modes. In one embodiment, the method 500 begins and the text input module 202 receives 502 text input in a first text input mode from a text input device. In certain embodiments, the first text input mode comprises a predictive text input mode. In a further embodiment, the trigger detection module 204 detects 504 a triggering event associated with the text input received in the first text input mode. In one embodiment, the triggering event is intended to change a text input mode of the text input device. In some embodiments, a mode change module 206 changes 506 the text input mode from the first text input mode to a second text input mode in response to the triggering event. The second text input mode, in one embodiment, comprises a literal text input mode, and the method 500 ends.

Figure 6:
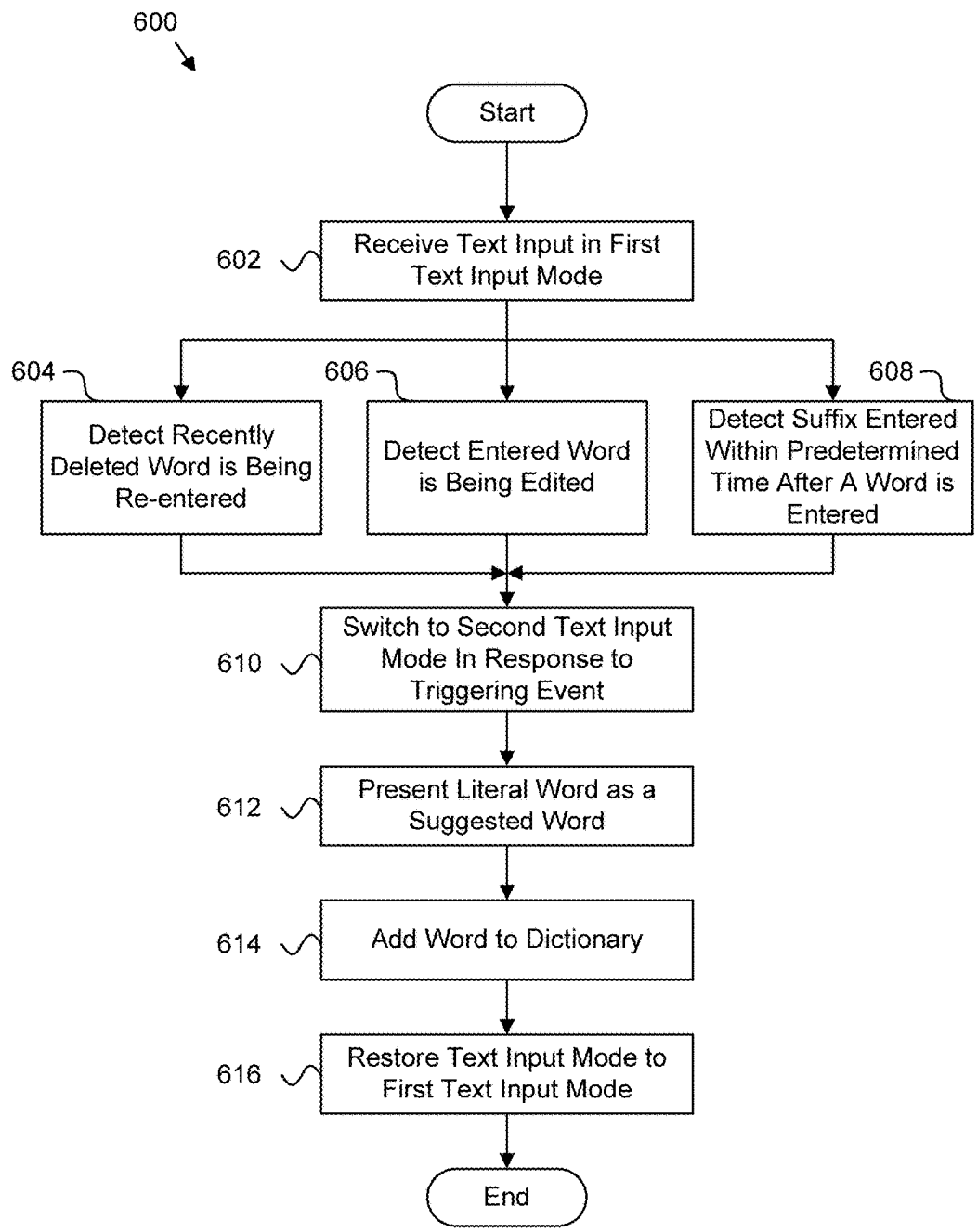
FIG. 6 is a schematic flow chart diagram illustrating one embodiment of another method for changing text input modes.

FIG. 6 depicts a flow chart diagram illustrating one embodiment of another method 600 for changing text input modes. In one embodiment, the method 600 begins and the text input module 202 receives 602 text input in a first text input mode from a text input device, such as a predictive text input mode. In one embodiment, the trigger detection module 204 detects 604 a triggering event intended to change the text input mode in response to determining that a recently deleted word is being re-entered. In certain embodiments, the trigger detection module 204 detects 606 a triggering event intended to change the text input mode in response to determining that a previously entered word is being edited. In a further embodiment, the trigger detection module 204 detects 608 a triggering event intended to change the text input mode in response to determining that a suffix for a previously entered word is entered within a predetermined time after the previously entered word has been entered.

In one embodiment, the mode change module 206 changes 610 the text input mode from the first text input mode to a second text input mode in response to the triggering event. For example, the mode change module 206 may change the text input mode from a predictive text input mode to a literal text input mode. In a further embodiment, the word suggestion module 304 may present 612 the word, as determined in a literal text input mode, as one of the suggested words presented by the word suggestion module 304. For example, as the user is swipe-entering characters of the word in a predictive text input mode, the word suggestion module 304 may present the literal spelling of the word as one of the word suggestions in response to one of the triggering event described above.

In one embodiment, the dictionary module 310 adds 614 a word entered in a literal text input mode to a dictionary associated with the text input device. In some embodiments, the dictionary is stored in a storage medium local to the information handling device 102 that includes the text input device. In various embodiments, the dictionary is located on a remote or cloud server. In one embodiment, the mode restore module 302 restores 616 the text input mode of the text input device from the second text input mode to the first text input mode in response to a restore event. As described above, the mode restore module 302 may detect that the user entered a character that indicates that a word has been successfully entered, such as a space, or other character. In another embodiment, the mode restore module 302 may detect that the text input device has not received input for a predefined period of time, and the method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a text input device;
   a processor operably coupled to the text input device;

a memory that stores code executable by the processor, the code comprising:
  code that receives text input in a first text input mode from the text input device, the first text input mode comprising a predictive text input mode;
  code that detects a triggering event associated with text input received in the first text input mode, the triggering event intended to change a text input mode of the text input device, the triggering event comprising determining that the text input comprises an initial sequence of characters of a word that is being re-entered in response to:
    a previous entry of the word being automatically replaced with a different predictive word; and
    the different predictive word being deleted responsive to the different predictive word replacing the entered word; and
  code that changes the text input mode from the first text input mode to a second text input mode in response to the triggering event, the second text input mode comprising a literal text input mode.

2. The apparatus of claim 1, wherein the triggering event comprises determining that the text input comprises a sequence of characters comprising at least a portion of a recently deleted word.

3. The apparatus of claim 1, wherein the triggering event comprises determining that a word entered in the first text input mode is being edited.

4. The apparatus of claim 1, wherein the triggering event comprises determining that the text input is entered within a predefined time after a word has been entered and that the text input comprises a suffix for the word.

5. The apparatus of claim 4, wherein the suffix is added to the word that precedes the suffix.

6. The apparatus of claim 4, wherein the suffix is selected from the group consisting of a plural suffix, an action suffix, and a hyphen.

7. The apparatus of claim 1, further comprising code that changes the text input mode from the second text input mode back to the first text input mode in response to a restore event.

8. The apparatus of claim 7, wherein the restore event comprises not receiving text input in the second text input mode for a predefined period of time.

9. The apparatus of claim 1, further comprising code that presents one or more suggested words based on the text input, wherein a word of the one or more suggested words is spelled according to a sequence of characters received in the second text input mode.

10. The apparatus of claim 1, further comprising code that changes the text input mode from the first text input mode to a second text input mode in response to detecting a mode-changing gesture.

11. The apparatus of claim 1, further comprising code that presents an option to change the text input mode from the first text input mode to the second text input mode in response to the triggering event.

12. The apparatus of claim 1, further comprising code that adds a word entered in the second text input mode to a word list associated with the text input device.

13. The apparatus of claim 1, wherein the text input device comprises a swipe-enabled text input device.

14. A method comprising:
  receiving, by use of a processor, text input in a first text input mode from a text input device, the first text input mode comprising a predictive text input mode;
  detecting a triggering event associated with text input received in the first text input mode, the triggering event intended to change a text input mode of the text input device, the triggering event comprising determining that the text input comprises an initial sequence of characters of a word that is being re-entered in response to:
    a previous entry of the word being automatically replaced with a different predictive word; and
    the different predictive word being deleted responsive to the different predictive word replacing the entered word; and
  changing the text input mode from the first text input mode to a second text input mode in response to the triggering event, the second text input mode comprising a literal text input mode.

15. The method of claim 14, wherein the triggering event comprises determining that the text input comprises a sequence of characters comprising at least a portion of a recently deleted word.

16. The method of claim 14, wherein the triggering event comprises determining that a word entered in the first text input mode is being edited.

17. The method of claim 14, wherein the triggering event comprises determining that the text input is entered within a predefined time after a word has been entered and that the text input comprises a suffix for the word.

18. The method of claim 14, further comprising presenting one or more suggested words based on the text input, wherein a word of the one or more suggested words is spelled according to a sequence of characters received in the second text input mode.

19. The method of claim 14, further comprising presenting an option to change the text input mode from the first text input mode to the second text input mode in response to the triggering event.

20. A program product comprising a computer readable storage medium that stores code executable by a processor, the executable code comprising code to perform:
  receiving text input in a first text input mode from a text input device, the first text input mode comprising a predictive text input mode;
  detecting a triggering event associated with text input received in the first text input mode, the triggering event intended to change a text input mode of the text input device, the triggering event comprising determining that the text input comprises an initial sequence of characters of a word that is being re-entered in response to:
    a previous entry of the word being automatically replaced with a different predictive word; and
    the different predictive word being deleted responsive to the different predictive word replacing the entered word; and
  changing the text input mode from the first text input mode to a second text input mode in response to the triggering event, the second text input mode comprising a literal text input mode.

\* \* \* \* \*